Sept. 16, 1969   D. J. BURKE   3,467,355
BALL VALVE WITH IMPROVED RESILIENT CLOSING MEANS
Filed Aug. 16, 1967   2 Sheets-Sheet 1

INVENTOR.
DONALD J. BURKE
BY
ATTORNEYS

Sept. 16, 1969  D. J. BURKE  3,467,355
BALL VALVE WITH IMPROVED RESILIENT CLOSING MEANS
Filed Aug. 16, 1967  2 Sheets-Sheet 2

INVENTOR.
DONALD J. BURKE

BY Head & Johnson

ATTORNEYS

United States Patent Office 3,467,355
Patented Sept. 16, 1969

3,467,355
BALL VALVE WITH IMPROVED RESILIENT CLOSING MEANS
Donald J. Burke, Tulsa, Okla., assignor to Continental Industries, Inc., Tulsa, Okla., a corporation of Oklahoma
Filed Aug. 16, 1967, Ser. No. 660,953
Int. Cl. F16k 1/14
U.S. Cl. 251—163     6 Claims

ABSTRACT OF THE DISCLOSURE

This invention relates to a ball type shut-off valve. The valve includes a body having a flow passageway therethrough defining a seat. A ball is loosely held within the flow passageway and pivoted by means of fingers extending from a pivot arm in cooperation with a pivot pin. The pivot arm is rotatively received in an opening in the valve body perpendicular to the axis of the flow passageway. The basic improvement of the invention includes means of resiliently retaining the ball in closed position in engagement with the valve seat. The resilient means is obtained through the usage of a spring member resiliently contacting the pivot arm shaft to apply resilient pressure of the pivot arm against the ball when the valve is in closed position.

Cross references

This invention is not a continuation or divisional application of any existing application; however, it is an improvement and alternate embodiment of the subject matter of application No. 555,344 entitled Ball Valve With Improved Resilient Closing Means, filed June 6, 1966, now Patent No. 3,343,803 and application No. 410,064, entitled Ball Type Shut-Off Valve, filed Nov. 10, 1964, now Patent No. 3,368,790.

Summary of invention

This invention provides a valve for use in closing the flow of liquids or gases. While the valve is usable for controlling liquids, it is particularly adapted for use in the gas industry to shut off gas flow lines, such as those from a main line to a residence. The valve utilizes the dependable principle of a ball seating in a valve seat. The ball is forced in contact with the seat to close the valve by the action of a cam surface. The unique feature and characteristic of the valve is the means provided wherein the ball is resiliently urged towards the seat.

One problem with ball-type valves as known in the past is that the mechanism for forcing the ball into the valve seat must be accurately machined, otherwise a firm seat is not achieved. If too much force is applied on the ball against the seat, either the seat or the ball will be damaged. Any permanent deformation of the ball or seat will result in leakage upon subsequent seating of the ball, and therefore the design and manufacture of a successful ball valve has required very accurate machining tolerances. In addition, any wear on the ball seat, the ball or the element which urges the ball into the seat has, with prior known devices, caused a reduction on the pressure of the seat against the ball reducing the sealing effectiveness of the valve.

Conventional ball valves usually require rubber or plastic seat to obtain necessary seal resiliency. This is a serious detriment in gas service since a fire can cause the rubber or plastic seat to melt resulting in valve failure. The valve of this invention eliminates this problem by providing a metal to metal resilient seat. In addition, many conventional ball valves require an expensive ball having a slot formed through the center for passage of fluid or gas. This invention provides a valve having a solid ball, much less expensive to manufacture.

To overcome basic problems of ball type valves, that is, accuracy of machining and manufacture, and leakage caused by wear of the parts, this invention provides a resilient means of urging the ball into the valve seat. Such resilient means compensates for inaccuracies in manufacturing and for wear of components. The resilient arrangement obviates the possibility of damaging the ball and causing potential leakage of the valve. In addition, wear is compensated by the resilient means within the valve.

Description of views

Detailed description

Figure 1:
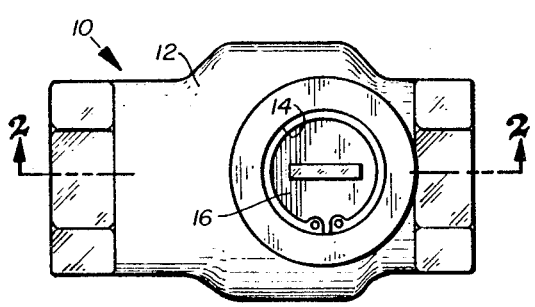
FIGURE 1 is an external view of an embodiment of the valve of this invention.

Referring now to the drawings and first to FIGURE 1, the valve of this invention is indicated generally by the numeral 10. The external parts of the valve include a body 12, an actuating arm opening 14 and the externally extending shaft portion 16 of of an actuating arm.

Figure 3:
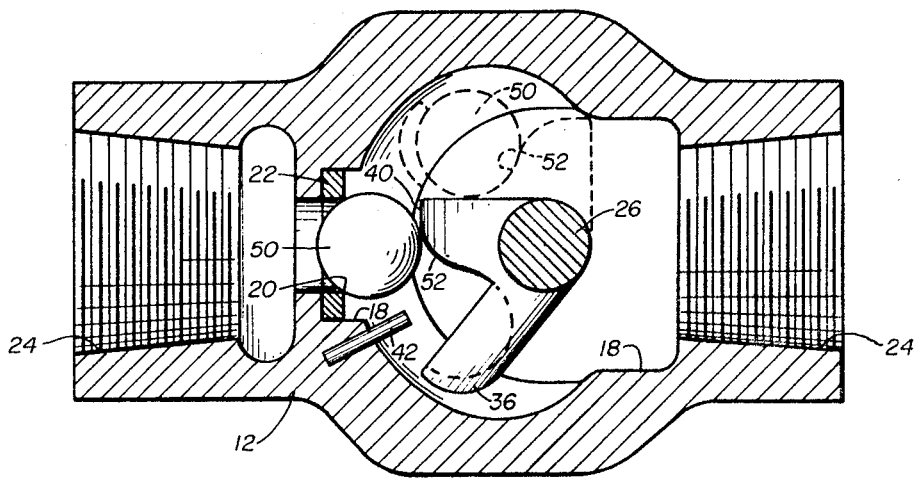
FIGURE 3 is another cross-sectional view taken along the line 3—3 of FIGURE 2.
Figure 2:
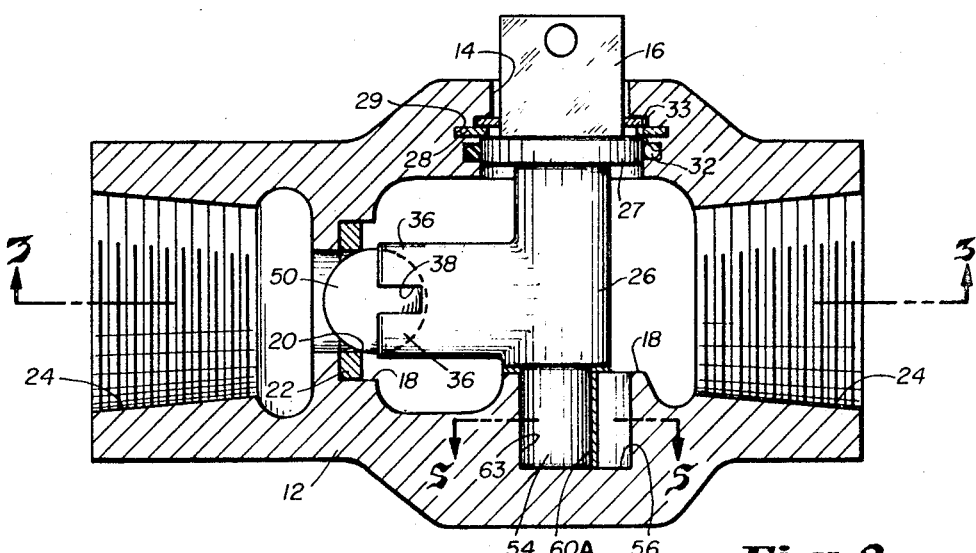
FIGURE 2 is an enlarged cross-sectional view taken along the lines 2—2 of FIGURE 1.

Referring to FIGURES 2 and 3, the internal mechanisms and the overall construction of the valve is best shown. The valve body 12 is provided with a flow passageway 18 therethrough. A part of the flow passageway is defined by valve seat 20 which may be formed as an integral part of the valve body 12, or, preferably, by an insert 22. The valve body may include, as shown, threads 24 at each end by means of which the valve is connected to piping. Pivotally mounted within the flow passageway 18 is an actuating arm 26 pivotally supported by the externally extending shaft portion 16. The actuating arm opening 14 receives an enlarged cylindrical shaft sealing portion 27. An expanding retainer washer 28 received in groove 29 retains the actuating arm 26 within the valve body. An O-ring gasket 32 positioned in a groove 33 in body opening 14 seals the shaft sealing portion 17 to prevent escape of gas or fluid.

The external end of the shaft portion 16 is flattened to receive a wrench whereby the actuating arm 26 may be pivoted.

Although not shown in the drawings, the body portion 12 may include a threaded boss portion to receive an internally threaded cap to completely and sealably cover the externally extending portion of shaft 16 so that, with such a cap in place, failure of gasket 32 will not permit any leakage of gas or fluid externally of the valve.

Figure 4:
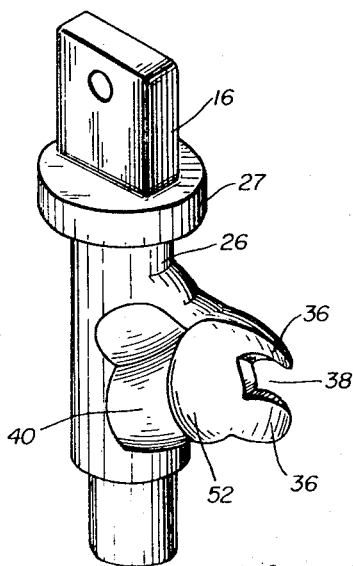
FIGURE 4 is an isometric view of the actuating arm of the valve of this invention.

Actuating arm 26 as best shown in FIGURE 4, is defined in part by two substantially parallel spaced fingers 36, the fingers 36 providing a notch or space 38 therebetween. In addition, the actuating arm 26 is further defined by a cam surface 40 positioned adjacent the fingers 36.

As best shown in FIGURE 3, a ball retaining pin 42 is affixed to the interior of the valve body 12 and extends within the flow passageway 18 adjacent the valve seat 20. The function of the ball retaining pin 42 will be described subsequently.

Positioned with the flow passageway 18 of the body 12 is a ball 50. In the opened position of the valve the ball 50 is loosely detained between the valve body and the actuating arm and is free to rotate. The ball 50 is moved by the actuating arm 26 and is controlled in its position by the actuating arm fingers 36 and the opposing inclined surface 52 of the actuating arm 26.

Referring to FIGURE 3, the operation of the valve is best shown. To close the valve the actuating arm 26 is pivoted from the dotted to the illustrated position. As the actuating arm 26 is pivoted towards the closed position the inclined surface 52 moves the ball 50 with it until the area of the seating surface 20 is reached. The ball is prevented from continuing its travel with the actuating arm by ball retaining pin 42 which holds the ball in the vicinity of the seating surface 20. The ball 50 is then contacted by the cam surface 40 which forces it into firm sealed contact with seating surface 20.

The valve is opened by pivotation of the actuating arm 26 in the opposite direction. The total pivot arc required from total open to closed position is approximately 90° or less. As the actuating arm 26 is pivoted towards open position the cam surface 40 first releases pressure on the ball 50 and then fingers 36 pick up the ball and move it away from the valve seat surface 20 to permit fluid or gas flow through the valve.

An important characteristic of the valve of this invention is the provision of means whereby the ball 50 is resiliently retained in its position against its valve seat surface 20 so that manufacturing tolerances as well as wear of the valve seat surface 20, ball 50, and the cam surface 40 is compensated for. This method of resiliently restraining the ball 50 into closed position is illustrated best by referring to FIGURES 2 and 5.

Figure 5:
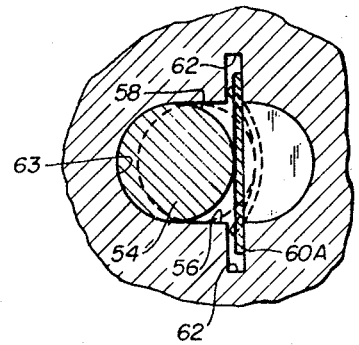
FIGURE 5 is a cross-sectional view of a portion of the valve of this invention showing means whereby resilient force is applied urging the ball member of the valve into engagement with the seat when the valve is in closed position, taken along the line 5—5 of FIGURE 2.

The actuating arm in 26 has an integral pivot post 54 which is coaxial with and opposite the shaft portion 16. Thus the actuating arm 26 pivots about coaxial shaft portion 16 and pivot post 54. The valve body 16 is provided with an internal pivot arm recess 56 in the flow passageway 18, which rotatably receives the pivot post 54. Resiliently engaging the exterior cylindrical surface of post 54 is a spring member 60A which, in FIGURES 2 and 5, is illustrated as being a flat leaf spring. In the embodiment wherein the spring 60A is a flat leaf type, the recess 56 includes opposed slot recesses 62 which receive the opposing ends of the leaf spring 60A. The preferred configuration of the pivot post recess 56 is, as shown in FIGURE 5, elongated and of semi-circular configuration at one end 63, rotatably receiving the pivot post 54. Thus the pivot post 54 is received between the semi-circular configurated recess 56 and spring 60A.

When the pivot arm 20 is rotated to closed position, shown in FIGURE 3, the cam surface 40 engages ball 50 and urges it into contact with seating surface 20. As the pivot arm is rotated to closed position, the spring 60A allows the pivot arm to deflect as shown in dotted lines in FIGURE 5. Thus the spring 60A resiliently urges the actuating arm cam surface 40 against ball 50 holding it in closed position. This compensates for any inaccuracies in manufacturing and allows greater tolerances in machining. Wear of the ball and seat is automatically compensated for insuring a long effective life of the valve. In addition, the ball 50 is not forced into engagement with the seat 20 in such a way as to deform either element.

The spring element 60A shown in FIGURES 2 and 5 is illustrated as flat but obviously the spring could be arched if desired.

Figure 6:
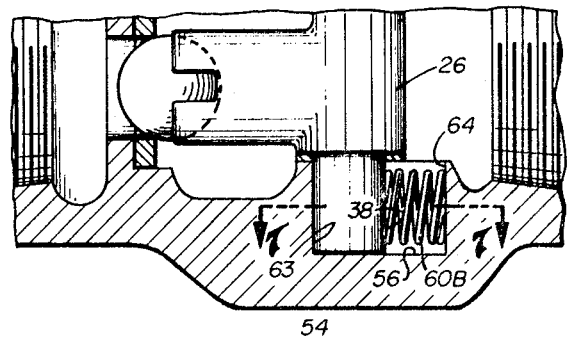
FIGURE 6 is a partial cross-sectional view showing an alternate embodiment of this invention.
Figure 7:
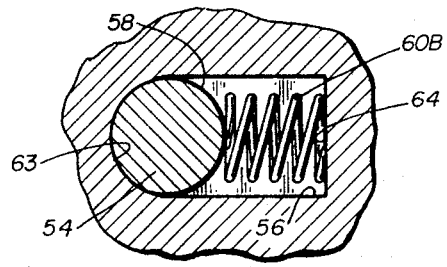
FIGURE 7 is a cross-sectional view taken long the line 7—7 of FIGURE 6.

FIGURES 6 and 7 show an alternate arrangement of the invention in which the spring element is a coil spring 60B. The coil spring 60 extends resiliently between the surface 64 of the pivot post recess 56 opposite the semi-cylindrical surface 63 and the external surface 58 of the actuating arm, and functions the same way and for the same purposes as previously described with reference to the embodiment including the leaf spring.

The illustrated embodiments including the leaf spring 60B are representative of other spring means which may be incorporated to resiliently urge the ball in position against the seat when the valve is closed.

What is claimed:

1. A valve comprising:
    a body having a flow passageway therethrough, a shaft opening in one side thereof, and a pivot post recess in said passageway coaxial with and opposite said shaft opening, a portion of the flow passageway being defined by a valve seat;
    a ball in said passageway adaptable, when moved against said valve seat, to close the valve;
    an actuating arm within said body passageway having an integral shaft portion sealably extending through said shaft opening, said shaft portion pivotally supporting said actuating arm whereby said arm may be pivoted by externally applied torque, the actuating arm having means to engage said ball to move said ball away from said valve seat when said arm is pivoted to the valve open position and to move said ball towards said valve seat when said arm is pivoted to the valve closed position, the actuating arm being defined further by a cam portion adaptable to force said ball into sealed contact with said seat when said actuating arm is pivoted to the valve closed position, said actuating arm having an integral pivot post coaxial with and opposite said shaft portion; and
    spring means in said pivot arm recess in said body engaging said pivot arm and resiliently urging said ball against said seat when said actuating arm is pivoted to the valve closed position.

2. A valve according to claim 1 including a ball retaining pin affixed to the interior of said body adjacent said valve seat, the retaining pin extending between said fingers of said actuating arm as it is pivoted, said pin retaining said ball between said valve seat and said cam portion of said actuating arm as said actuating arm is pivoted to the closed position.

3. A valve according to claim 1 wherein said spring means includes a leaf spring supported by said valve body and extending across said pivot post recess, said leaf spring deflectably and slidably engaging said pivot arm.

4. A valve according to claim 1 wherein said spring means includes a compressed coil spring received in said pivot post recess and compressibly extending between one boundary of said pivot post recess and said actuating arm pivot post.

5. A valve according to claim 1 wherein said actuating arm pivot post is cylindrical, and wherein said pivot post recess in said body is elongated and of semi-circular configuration at one end rotatably receiving said cylindrical actuating arm pivot post, and wherein said pivot post recess includes opposed outwardly extending slot recesses, and wherein said spring means includes a leaf spring having the end thereof received in said slot recesses, said leaf spring extending across said pivot post recess and deflectably engaging said actuating arm pivot post.

6. A valve according to claim 1 wherein said actuating arm is defined in part by substantially paralleled spaced fingers which engage and move said ball as said actuating arm is pivoted.

References Cited

UNITED STATES PATENTS

| | | | |
|---|---|---|---|
| 2,472,677 | 6/1949 | Phillips | 251—176 |
| 2,499,732 | 3/1950 | Diehl | 251—163 |
| 2,650,059 | 8/1953 | Hjulion | 137—449 X |
| 2,666,617 | 1/1954 | Paul | 137—271 |
| 2,750,960 | 6/1956 | Hansen | 251—158 X |
| 3,086,746 | 4/1963 | Holleron | 251—83 |

CLARENCE R. GORDON, Primary Examiner

U.S. Cl. X.R.

251—78, 176, 187, 204